United States Patent [19]

Foster

[11] Patent Number: 4,726,833

[45] Date of Patent: Feb. 23, 1988

[54] BLOWHEAD FOR USE IN THE MANUFACTURE OF GLASS CONTAINERS

[75] Inventor: Thomas V. Foster, Doncaster, England

[73] Assignee: Emhart Industries, Inc., Farmington, Conn.

[21] Appl. No.: 924,233

[22] Filed: Oct. 28, 1986

[30] Foreign Application Priority Data

Nov. 8, 1985 [GB] United Kingdom ............... 8527643

[51] Int. Cl.⁴ .............................................. C03B 9/36
[52] U.S. Cl. ...................................... 65/300; 65/265; 65/267
[58] Field of Search .................. 65/300, 301, 265, 84, 65/85, 234, 267, 261

[56] References Cited

U.S. PATENT DOCUMENTS

| | | | |
|---|---|---|---|
| 3,272,612 | 9/1966 | Hamilton | 65/301 X |
| 3,880,640 | 4/1975 | Jenkins | 65/300 X |
| 4,200,449 | 4/1980 | Martin | 65/300 X |

Primary Examiner—Arthur Kellogg
Attorney, Agent, or Firm—Spencer T. Smith

[57] ABSTRACT

A blowhead (10; 100) for blowing air through a neck opening (12; 112) of a glass parison (14; 114) to cause it to expand. The blowhead defines an air supply passage (28; 128) through which air can enter the parison and an exhaust passage (45; 145) through which air can exhaust from the parison. The cross-sectional area, transversely to the direction of air flow, of at least a portion of the exhaust passage is adjustable.

10 Claims, 18 Drawing Figures

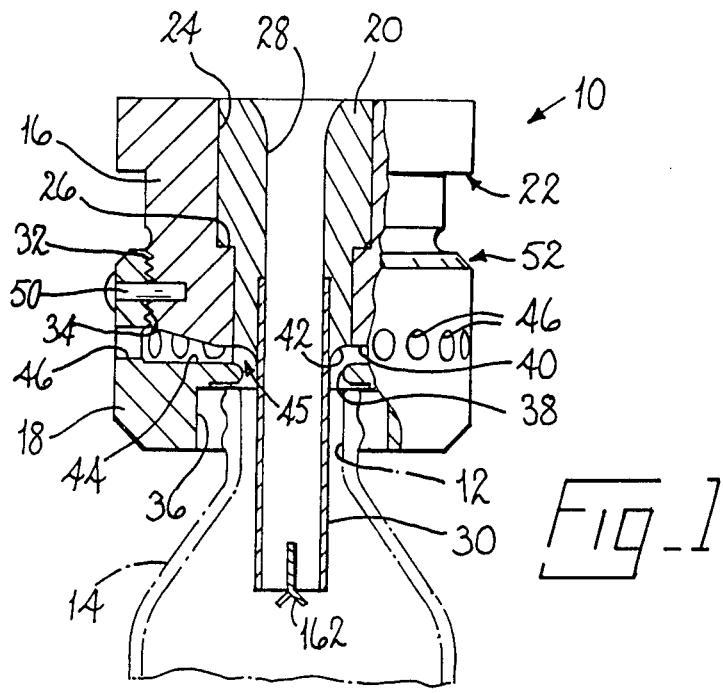
Fig_1
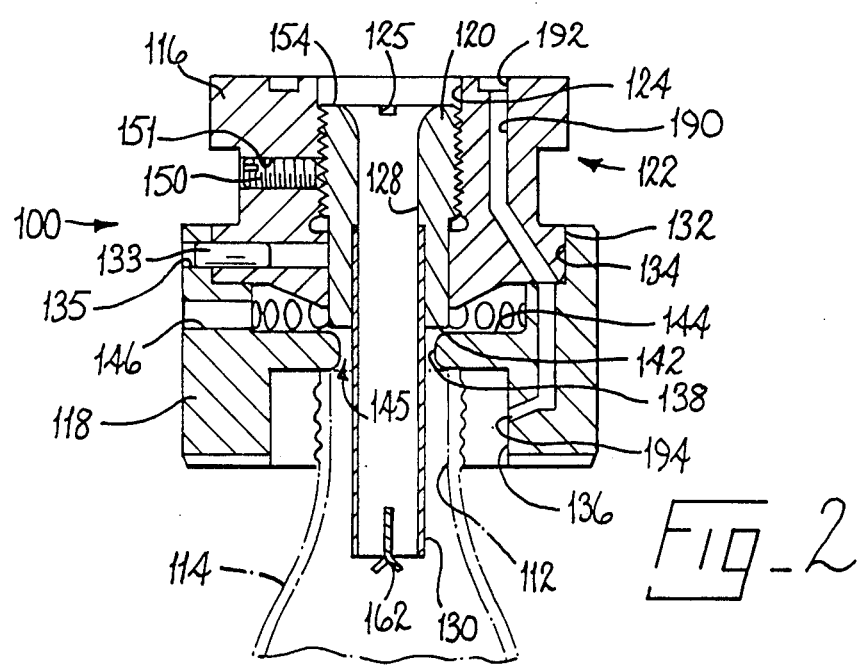
Fig_2

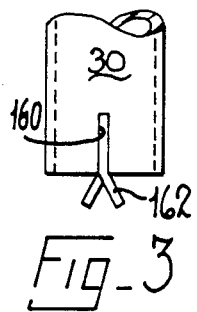 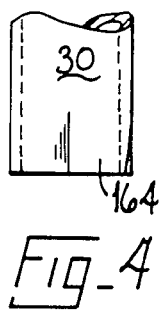 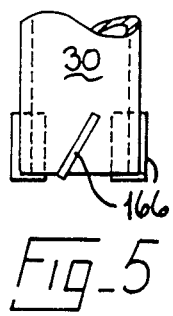 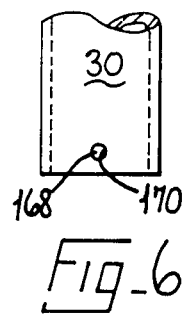
Fig_3    Fig_4    Fig_5    Fig_6
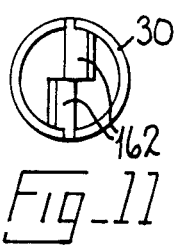 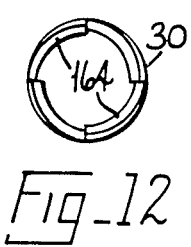 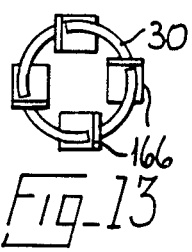 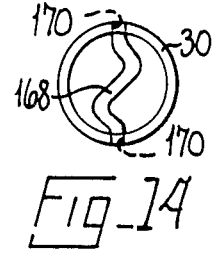
Fig_11   Fig_12   Fig_13   Fig_14
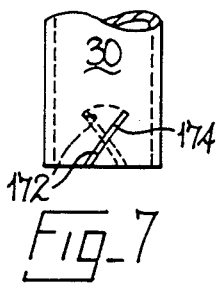 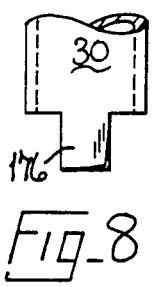 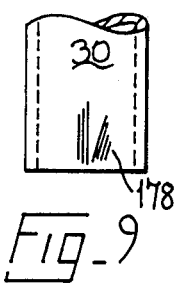 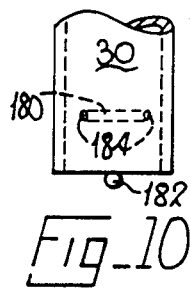
Fig_7    Fig_8    Fig_9    Fig_10
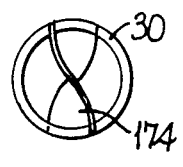 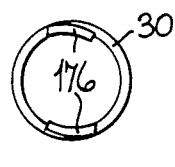 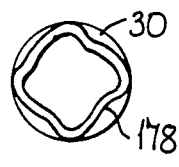 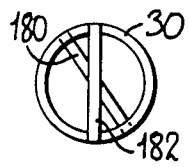
Fig_15   Fig_16   Fig_17   Fig_18

BLOWHEAD FOR USE IN THE MANUFACTURE OF GLASS CONTAINERS

BACKGROUND OF THE INVENTION

This invention is concerned with a blowhead for use in the manufacture of glass containers for blowing air through a neck opening of a glass parison positioned in a cavity of a mould to cause the parison to expand to the shape of the cavity.

In the manufacture of glass containers, a gob of molten glass is first formed into a parison either by a blowing or by a pressing operation and the parison is then transferred to a cavity of a mould having the shape which it is desired that the container should have and air is introduced into the parison to cause it to expand to the shape of the cavity. The air is supplied by means of a blowhead which comprises a body defining an air supply passage through which, when the blowhead is positioned on the mould, air can enter the parison, and an exhaust passage through which air can exhaust from the parison.

In some types of conventional blowheads, the exhaust passage remains unobstructed throughout the blowing operation so that air can enter the parison and pass out through the exhaust passage throughout the blowing operation. This enables heat to be extracted from the interior of the parison by the air flowing therethrough and, therefore, reduces the time during which the glass must remain in the mould cavity. However, the ratio of the cross-sectional area, transversely to the direction of air flow, of the air supply passage to the exhaust passage is critical to an efficient blowing operation. This ratio has to take account of the increase in the volume of the air in the parison due to the temperature rise experienced by the air and also of the pressure that it is necessary to create in the parison to enable the blowing to take place. In conventional blowheads, the ratio between the aforementioned areas is fixed and cannot be adjusted to suit varying operational conditions. In another type of known blowhead, a valve is used to keep the exhaust passage closed throughout the blowing operation and the valve is then opened to allow a separate cooling operation during which air flows through the air supply passage around the inside of the blown parison and out through the exhaust passage. However, this type of blowhead has the disadvantages that a longer period is required in the mould as the blowing operation is followed by a cooling operation and also that the blowhead is more complex because of the need to provide a valve.

It is an object of the present invention to provide a blowhead in which the ratio between the areas transversely to the direction of air flow, of the air supply passage to the exhaust passage can be adjusted.

BRIEF SUMMARY OF THE INVENTION

The invention provides a blowhead for use in the manufacture of glass containers for blowing air through a neck opening of a glass parison positioned in the cavity of a mould to cause the parison to expand to the shape of the cavity, the blowhead comprising a body defining an air supply passage through which, when the blowhead is positioned on the mould, air can enter the parison, and an exhaust passage through which air can exhaust from the parison, the cross-sectional area, transversely to the direction of air flow, of at least a portion of the exhaust passage being adjustable.

In a blowhead according to the last preceding paragraph, adjustment of the effective area of the exhaust passage can be used to alter the ratio between the effective areas of the air supply passage and of the exhaust passage thereby enabling the pressure created in the parison to be adjusted.

Conveniently, the exhaust passage may pass between two portions of the body which are screw-threadedly engaged with one another so that rotation of one portion relative to the other serves to adjust said cross-sectional area. This arrangement provides a simple means of adjusting said cross-sectional area. The blowhead may also comprise locking means operable to lock said portions against rotation to prevent alteration of said cross-sectional area. In this way, accidental variation of said cross-sectional area can be avoided during operation. A scale may be provided on one of the said portions to indicate said cross-sectional area to enable adjustments to be made more easily.

Preferably, to enable a suitable pressure to be achieved in the parison, said cross-sectional area may be adjustable up to an area equal to 2.5 times the minimum cross-sectional area, transversely to the direction of air flow, of the air supply passage.

In order to reduce the noise caused by the emission of air from the exhaust passage into the atmosphere, the exhaust passage may enter a chamber defined by the body, which chamber increases in cross-sectional area in the direction of air flow. This chamber can act as a diffuser chamber to reduce the noise which would otherwise be created by the air and the air after diffusion can be emitted to the atmosphere.

The air supply passage may extend as a tube into the parison and at least one air deflecting surface may be arranged to deflect the air leaving the tube thereby giving it a swirling motion. This arrangement enables more efficient cooling of the interior of the parison by providing a swirling motion to the air within the parison.

Some conventional blowheads define passages through which air is blown on to the outside of the neck portion or "finish" of a parison to cool the parison. The air is taken from the blowing air supply so that cooling takes place during blowing. However, it is advantageous to provide a separate air supply to such passages so that the finish can be cooled and "set" before blowing. This avoids the possibility of the finish bulging during blowing.

BRIEF DESCRIPTION OF THE DRAWINGS

There now follow detailed descriptions, to be read with reference to the accompanying drawings of two blowheads which are illustrative of the invention. It is to be understood that the illustrative blowheads have been selected for description by way of example.

In the drawings:

FIG. 1 is a side elevational view, partly in section, of the first illustrative blowhead;

FIG. 2 is a vertical cross-sectional view of the second illustrative blowhead;

FIGS. 3 to 10 are side elevational views of lower end portions of eight alternative blow tubes which may be used with the first and the second illustrative blowheads; and FIGS. 11 to 18 are views from underneath of the tubes shown in FIGS. 3 to 10, FIG. 11 being an underneath view of the tubes of FIG. 3, FIG. 12 being an underneath view of the tube of FIG. 4, and so on.

DETAILED DESCRIPTION OF PREFERRED EMBODIMENT OF THE INVENTION

The first illustrative blowhead 10 shown in FIG. 1 is for use in the manufacture of glass containers for blowing air through a neck opening 12 of a glass parison 14 positioned in cavity of a mould (not shown) to cause the parison 14 to expand to the shape of the cavity. The blowhead 10 comprises a body formed by an upper portion 16, a lower portion 18, and a central portion 20. The upper portion 16 of the body is generally cylindrical but with a flange 22 formed at an upper end thereof. The flange 22 serves as a fitting by which the blowhead 10 can be mounted, in conventional manner, on moving means therefor operable to move the blowhead between an operative position thereof on top of a mould and an out-of-the-way position thereof. A lower cylindrical outer surface 32 of the body portion 16 is screw-threaded and a central passage 24 extends through the portion 16, the passage having a step 26 in it. The lower surface 40 of the portion 16 tapers downwardly towards the centre of the blowhead 10.

The lower portion 18 of the body is generally cylindrical having a recess in the top thereof into which a lower portion of the body portion 16 is received. This recess is surrounded by a screw-threaded surface 34 of the lower portion 18 which is in threaded engagement with the surface 32. The engagement between the surfaces 32 and 34 serves to support the lower portion 18. The lower portion 18 also has a recess 36 in the bottom surface thereof arranged to surround the neck portion (or "finish") of a parison 14. The passage 24 continues through the lower body portion 18, being defined by an annular surface 38 of the portion 18, and enters the recess 36. The portion 16 does not extend to the bottom of the recess surrounded by the surface 34 so that a chamber 44 is formed between the portions 16 and 18.

The central body portion 20 is received in the passage 26 and rests on the step 26. The lower surface 42 of the body portion 20 is flush with the lower surface 40 of the body portion 16 and tapers downwardly to a tube 30 supported by the portion 20 which projects downwardly through the recess 36 and into the neck opening 12 of the parison 14. The central body portion 20 defines a cylindrical air supply passage 28 which passes centrally downwardly through the portion 20 and continues as the tube 30.

The blowhead 10 also defines an exhaust passage 45 through which air can exhaust from the interior of the parison. This exhaust passage is generally annular and is defined, on one side, by the outer surface of the tube 30 and the surface 42 of the portion 20 and, on the other side, by the surface 38 of the portion 18. From the exhaust passage 45, the air passes into the chamber 44 which acts as a diffuser chamber. The chamber 44 has a cross-sectional area, transversely to the direction of air flow therein, which increases in the direction of air flow in the chamber (see FIG. 1), this being achieved by the downward taper of the surface 40 (i.e. the chamber widens in the direction of air flow). Air can leave the chamber 44 and enter the atmosphere through a series of horizontally extending bores 46 formed in the portion 18.

The cross-sectional area, transversely to the direction of air flow, of the portion of the exhaust passage between the upper and lower body portions 16 and 18 is adjustable by rotating the portion 18 relative to the portion 16 thereof so that the height of the portion 16 relative to the portion 18 and the width of the gap therebetween alters by the action of the screw thread between the surfaces 32 and 34. In this way, the ratio between the cross-section area of the exhaust passage 45 and that of the air supply passage 28 can be adjusted to provide a suitable pressure in the parison 14. Locking means in the form of a pin 50 is provided to lock the portions 16 and 18 against rotation to prevent accidental alteration of the cross-sectional area of the exhaust passage. The pin 50 passes through the portion 18 and enters a bore in the portion 16 in the surface 32 thereof, a series of bores being provided around the portion 16 to receive the pin 50 at different positions of the portion 18.

A scale 52 is provided on an outer surface of the portion 18 to indicate said cross-sectional area of the exhaust passage 45 by reference to a datum mark (not shown) on an outer surface of the portion 16.

The cross-sectional area of the adjustable portion of the exhaust passage is arranged to be adjustable up to an area equal to 2.5 times the minimum cross-sectional area, transversely to the direction of air flow, of the air supply passage. For example, the tube 30 may have an internal diameter of 8.0 mm giving a cross-sectional area of approximately 50 square mm. The diameter of the annular surface 38 of the exhaust passage may be 16 mm and the exterior diameter of the tube 30 may be 10 mm, giving an annular gap 3 mm wide for the exhaust passage and having a cross-sectional area of approximately 122.5 square mm or approximately 2.5 times the area of the air supply passage 28. Although the adjustable portion of the exhaust passage could be adjusted to be greater in area than this gap, there is no advantage in doing so as the area of the gap would control the air flow in that situation. The area of the adjustable portion is, therefore, adjusted up to approximately 2.5 times the area of the air supply passage 28. The adjustable portion is an annulus of radius 10 mm (this being the radius of the passage 24 at this point) and thickness set by the height of the portion 18 relative to the portion 16. Thus, the area of the adjustable portion is approximately 62.8 times the gap between the portions 16 and 18 and an adjustment of this height up to approximately 2 mm is appropriate.

In the operation of the first illustrative blowhead 10, the blowhead is positioned on a mould so that the tube 30 extends through the opening 12 of a parison 14. Air under pressure is introduced into the passage 28 so that the air flows through the tube 30 and into the parison causing it to expand. Air leaves the parison by passing between the tube and the neck portion 12 and out through the exhaust passage 45 into the diffuser chamber 44 where the noise produced thereby is reduced. Air leaves the diffuser chamber 44 through the holes 46. If it is desired to alter the pressure achieved in the parison 14, the pin 50 is removed and the portion 18 rotated relative to the portion 16 to increase or decrease the width of the exhaust passage. This is done with reference to the scale 52. When the desired width has been achieved, the pin 50 is replaced (in a different bore in the portion 16) to prevent rotation of the portion 18 relative to the portion 16 and the blowhead 10 is returned to operation.

The second illustrative blowhead 100 shown in FIG. 2 is also for use in the manufacture of glass containers for blowing air through a neck opening 112 of a glass parison 114 positioned in a cavity of a mould (not shown) to cause the parison 114 to expand to the shape of the cavity. The blowhead 100 comprises a body which is formed in three parts, an upper portion 116, a lower portion 118 and a central portion 120. The upper portion 116 is formed with a flange 122 by which the blowhead 100 can be mounted on moving means therefor (not shown) of conventional construction. The upper portion 116 has an outer cylindrical surface 132 which is engaged by a cylindrical surface 134 of the lower portion 118 which surrounds an upwardly opening recess in the lower portion 118. The portions 116 and 118 are pinned together by pins 133 in bores 135 which pass through the surfaces 132 and 134. Thus, the lower portion 118 is supported by the upper portion 116. A recess 136 in the lower surface of the body portion 118 surrounds the finish of the parison 114. The central portion 120 of the body is generally cylindrical and is received in a passage 124 which enters the upper side of the portion 116. The passage 124 is screwthreaded and threadedly engaged by a screw thread formed on an outer surface of the portion 120. The portion 120 is provided with a slot 125 whereby it can be rotated relative to the portion 116 so that, by the action of the threads, the height of the portion 120 relative to the portion 116 can be adjusted.

The body of the blowhead 100 defines a air supply passage 128 which passes through the portion 120 downwardly and is continued by a tube 130 supported by the portion 120 which extends through a passage in the portion 118 and enters the parison 114 through the neck opening 112. Thus, when the blowhead 100 is positioned on a mould, air can enter the parison 114 through the passage 128. The body also defines an exhaust passage 145 through which air can exhaust from the parison. This passage is defined, on the one side, by an annular surface 138 of the body portion 118 and, on the other side, by the outer surface of the tube 130 and a flat lower surface 142 of the central portion 120. The exhaust passage 145 enters a noise-reducing diffuser chamber 144 (similar to the chamber 44) formed between the upper and lower portions 116 and 118 of the body. Air can leave the chamber 144 through a series of bores 146 in the portion 118.

The cross-sectional area, transversely to the direction of air flow, of the portion of the exhaust passage 145 between the surfaces 138 and 142 can be adjusted by turning the portion 120 relative to the portion 116 so that by the action of the screw threads, the height of the portion 120 relative to the portion 116 and, therefore, the width of the gap between the portions 120 and 118 is altered. The blowhead 100 also comprises locking means in the form of a screw 150 which is threadly received in a bore 151 in the portion 116. The bore 151 extends to the passage 124 so that the screw 150 can be screwed into the bore 151 until it engages the body portion 120 and locks it against rotation relative to the portion 116. The screw 150, therefore, provides locking means operable to lock the portions 116 and 120 against rotation to prevent alteration of the cross-sectional area of the portion 140 of the exhaust passage. A scale (not shown) is provided on an upper surface 154 of the portion 120 around the passage 128. The scale provides an indication of the cross-sectional area of the adjustable portion of the exhaust passage 145 by providing an indication of how far the portion 120 has been turned relative to a mark (not shown) on the portion 116. The blowhead 100 is operable in a similar manner to the blowhead 10 and the cross-sectional area of the adjustable portion of the exhaust passage 145 is adjustable up to an area equal to 2.5 times the minimum cross-sectional area, transversely to the direction of air flow, of the air supply passage 128.

In the blowhead 10 and 100, the air supply passage 28 or 128 extends as a tube 30 or 130 into the parison 14 or 114. In both cases, at least one air deflecting surface is arranged to deflect the air leaving the tube thereby giving it a swirling motion. FIGS. 3 and 11 show the construction of the lower part of the tube 30, the tube 130 being of identical construction. Two longitudinal slits 160 extend upwardly from the bottom end of the tube 30 at diametrically opposed portions thereof. A deflector plate 162 has its opposite ends received in these slots 160 and extends across the tube 30 (see FIG. 11) the deflector plate 162 also extends downwardly beyond the tube 30 and is centrally slit with the slit portions being bent so that they are inclined relative to the longitudinal axis of the tube 30 so that air issuing from the tube 30 is deflected by the plate 162 and given a swirling motion as it leaves the tube 30.

FIGS. 4 to 10 and 12 to 18 show alternative constructions for providing air deflecting surface arranged to deflect the air leaving the tube thereby giving it swirling motion. In the construction of FIGS. 4 and 12, the lower end portion of the tube 30 is slit into four portions 164 which are twisted relative to one another so that one edge of each portion 164 is nearer to the longitudinal axis of the tube 30 than the other edge of the portion. In the construction of FIGS. 5 and 13, four inclined slits are formed in the lower end portion of the tube 30 and a deflector plate 166 is received in each slit, the deflector plates 166 being rectangular in shape and extending towards the longitudinal axis of the tube 30. In the construction of FIGS. 6 and 14, the deflector surface is provided by a wire 168 mounted between two bores 170 formed in diametrically opposed portions of lower end portion of the tube 30. Between the two bores 170, the wire 168 takes a sinuous path across the centre of the tube 30. In the construction of FIGS. 7 and 15, two inclined slits 172 are formed in the lower end portion of the tube 30. The slits 172 (see FIG. 7) are inclined in opposite directions and are formed in diametrically opposed portions of the tube 30. A deflector plate 174 is received in the slits 172 being twisted at a central region thereof which is in the centre of the tube 30. In the construction of FIGS. 8 and 16, two diametrically opposed portions of the lower end portion of the tube 30 have been removed and the remaining portions 176 thereof have been twisted so that one edge thereof is nearer to the longitudinal axis of the tube 30 so that the portions 176 provide the deflection surfaces. In the construction of FIGS. 9 and 17, the lower end of the portion 30 has been squashed so that portions 178 thereof are nearer to the longitudinal axis of the tube 30 than previously so that they form deflecting surfaces for the air. In the construction of FIGS. 10 and 18, two wires 180 and 182 are stretched across the lower end portion of the tube 30 so that they cross one another at an acute angle (see FIG. 18) the wire 182 is secured to the lowermost surface of the tube 30 while the wire 180 extends between two diametrically opposed bores 184 formed in the tube 30.

The blowheads 10 and 100 can be used in an efficient blowing operation in which the pressure in the parison 14 or 114 can be closely controlled and efficient cooling of the parison achieved by the flow of air through the parison interior of the parison so that the time that the glass spends in the mould can be reduced to the minimum consistent with the production of acceptable glassware. If it is desired to cool the exterior of the finish of the parison, cooling passages such as that shown at 190 in the blowhead 100 can be used. The passage 190 extends downwardly from an annular groove 192 in a upper surface of the portion 116 of the blowhead 100 and enters the lower portion 118 thereof. The passage 190 extends to a nozzle 194 formed in recess 136 around the finish of the parison so air supplied to the groove 192 passes through the passage 190 and is blown on to the outside of the finish. Air can be supplied to the groove 192 separately from the passage 128 so that, if desired, the finish of the parison can be cooled before the blowing operation.

I claim:

1. A blowhead for use in the manufacture of glass containers for blowing air through a neck opening of a glass parison positioned in a cavity of a mould to cause the parison to expand to the shape of the cavity, the blowhead comprising a body defining an air supply passage through which, when the blowhead is positioned on the mould, air can enter the parison, and an exhaust passage through which air can exhaust from the parison, and means for adjusting the cross-sectional area, transversely to direction of air flow, of at least a portion of the exhaust passage, said body including first and second body portions which are screw-threadedly engaged with one another so that rotation of one portion relative to the other serves to adjust said cross-sectional area.

2. A blowhead according to claim 1, wherein the blowhead comprises, locking means operable to lock said portions against rotation to prevent alterations of said cross-sectional area.

3. A blowhead according to claim 1, wherein a scale is provided on one of said portions to indicate said cross-sectional area.

4. A blowhead according to claim 1, wherein said cross-sectional area is adjustable up to area equal to 2.5 times the minimum cross-sectional area, transversely to the direction of air flow, of the air supply passage.

5. A blowhead according to claim 1, wherein the exhaust passage enters a chamber defined by the body, which chamber increases in cross-sectional area in the direction of air flow.

6. A blowhead according to claim 1, wherein the air supply passage extends as a tube into the parison and at least one air deflecting surface is arranged to deflect the air leaving the tube thereby giving it a swirling motion.

7. A blowhead according to claim 1, wherein the blowhead defines passages through which air can be blown on to the outside of the finish of a parison, the passages being arranged to be supplied from a different source to the air supply passage.

8. A blowhead according to claim 1, wherein said first body portion has a cylindrical recess extending vertically downwardly from the top surface thereof,
at least the upper portion of said recess sidewall being threaded and the lower portion of said recess sidewall including a plurality of holes extending from said recess to the outer surface of said first body portion, and
said second body portion has a bottom threaded cylindrical portion for threaded insertion into said first body portion recess, whereby an exhaust passage will be defined therebetween, the cross-sectional area of which, transversely to the direction of air flow, is selectively adjustable by rotating said first body portion relative to said second body portion.

9. A blowhead according to claim 8, wherein the bottom surface of said second body portion is tapered relative to the bottom surface of said first body portion recess to define an increasing cross-sectional area toward said recess sidewall.

10. A blowhead according to claim 1, wherein said first body portion has a vertically extending passage therethrough,
the upper cylindrical portion of said passage being threaded, and
an annular chamber communicating with said passage below said threaded portion and having a selectively sized annular opening,
hole means extending between the outer surface of said first body portion and said chamber, and
said second body portion including
said air supply passage,
a cylindrical threaded portion at one end for threaded insertion into said threaded portion of said first body portion and
an annular portion at the other end which will block the entrance to said chamber when said second body portion is screwed into said first body portion to a first depth and which will not block said entrance when said second body portion is screwed into said first body portion to a second depth.

* * * * *